(12) United States Patent
Hoferer et al.

(10) Patent No.: US 10,534,357 B2
(45) Date of Patent: Jan. 14, 2020

(54) DATA EXCHANGE BETWEEN A MACHINE AND AN EXTERNAL CONTROL MODULE IN THE BEVERAGE INDUSTRY

(71) Applicant: KRONES AG, Neutraubling (DE)

(72) Inventors: Maximilian Hoferer, Neutraubling (DE); Theodor Bielmeier, Neutraubling (DE)

(73) Assignee: Krones AG, Neutraubling (DE)

( * ) Notice: Subject to any disclaimer, the term of this patent is extended or adjusted under 35 U.S.C. 154(b) by 149 days.

(21) Appl. No.: 15/555,374

(22) PCT Filed: Mar. 17, 2016

(86) PCT No.: PCT/EP2016/055824
§ 371 (c)(1),
(2) Date: Sep. 1, 2017

(87) PCT Pub. No.: WO2016/146756
PCT Pub. Date: Sep. 22, 2016

(65) Prior Publication Data
US 2018/0039259 A1 Feb. 8, 2018

(30) Foreign Application Priority Data

Mar. 18, 2015 (DE) .................. 10 2015 204 922

(51) Int. Cl.
*G05B 23/02* (2006.01)
*G05B 19/042* (2006.01)
(Continued)

(52) U.S. Cl.
CPC ....... *G05B 23/0216* (2013.01); *G05B 19/042* (2013.01); *G05B 19/409* (2013.01);
(Continued)

(58) Field of Classification Search
CPC ........ G05B 19/409; G05B 2219/36159; G05B 19/41855; G05B 2219/36133; G05B 23/0216; G05B 23/0267; H04L 67/125
See application file for complete search history.

(56) References Cited

U.S. PATENT DOCUMENTS

2008/0065243 A1* 3/2008 Fallman ............... G05B 19/409
700/83
2014/0303755 A1 10/2014 Landgraf et al.
(Continued)

FOREIGN PATENT DOCUMENTS

DE 102004056089 B3 2/2006
DE 102010041661 A1 3/2012
(Continued)

OTHER PUBLICATIONS

ISA European Patent Office, International Search Report Issued in Application No. PCT/EP2016/055824, dated May 6, 2016, WIPO, 4 pages.
(Continued)

*Primary Examiner* — David R Lazaro
(74) *Attorney, Agent, or Firm* — McCoy Russell LLP

(57) ABSTRACT

The application relates to a device for a machine in the beverage industry, comprising an HMI for user input of control commands for the machine. The device is configured to be connectable to an external control module via a wireless communication connection. The device can then exchange an HMI data record with the external control module by use of this wireless connection. The device can receive at least one HMI data record from the external control module, said data record comprising data or parameters for configuring the HMI. Furthermore, at least one HMI data set can be transferred from the HMI to the external control module and comprise data or parameters for evaluation or storage by the external control module. The device can be a separate module of the machine and can accordingly be connected to the HMI, communicate with the HMI, or at least control the HMI.

17 Claims, 2 Drawing Sheets

(51) Int. Cl.
G05B 19/409 (2006.01)
G05B 19/418 (2006.01)
H04L 29/08 (2006.01)

(52) U.S. Cl.
CPC . *G05B 19/41845* (2013.01); *G05B 19/41855* (2013.01); *H04L 67/125* (2013.01); *G05B 2219/36133* (2013.01); *G05B 2219/36159* (2013.01)

(56) References Cited

U.S. PATENT DOCUMENTS

2018/0039259 A1* 2/2018 Hoferer .............. G05B 23/0216
2019/0107823 A1* 4/2019 Hoferer ................ G05B 19/409

FOREIGN PATENT DOCUMENTS

| DE | 102013005769 A1 | 10/2014 | | |
|---|---|---|---|---|
| GB | 2513000 A | * | 10/2014 | ........... G05B 19/409 |
| GB | 2513000 A | | 10/2014 | |

OTHER PUBLICATIONS

China National Intellectual Property Administration of the People's Republic of China, Office Action Issued in Application No. 201680016342.X, dated Aug. 19, 2019, 20 pages.

* cited by examiner

DATA EXCHANGE BETWEEN A MACHINE AND AN EXTERNAL CONTROL MODULE IN THE BEVERAGE INDUSTRY

CROSS-REFERENCE TO RELATED APPLICATIONS

The present application is a U.S. National Phase of International Patent Application Ser. No. PCT/EP2016/055824 entitled "DATA EXCHANGE BETWEEN A MACHINE AND AN EXTERNAL CONTROL MODULE IN THE BEVERAGE INDUSTRY," filed on Mar. 17, 2016. International Patent Application Serial No. PCT/EP2016/055824 claims priority to German Patent Application No. 10 2015 204 922.1, filed on Mar. 18, 2015. The entire contents of each of the above-referenced applications are hereby incorporated by reference for all purposes.

TECHNICAL FIELD

The application relates to a device for controlling a machine in the beverage industry, in particular a filling, labeling or packaging machine, a method for controlling a machine in the beverage industry, and an external control module, in particular a mobile device, for data exchange with a machine in the beverage industry.

PRIOR ART

In the beverage industry, human machine interface modules (HMI modules) are used to control machines such as, for example, filling, labeling or packaging machines by a user. Due to increasingly more complex machines and industrial plants, also controlling such machines becomes more complex and complicated. Mistakes caused by incorrect operation of an industrial plant can cause tremendous damage and entail high costs. This gives rise to a desire to make the machines and/or process systems more manageable and, if necessary, to adapt them. One measure for partial control of industrial plants are HMIs, which commonly have a display screen with a graphical user interface and one or more control elements. Alternatively, the display screen can be a touch screen in which user inputs are entered directly via the display screen by use of a finger or a stylus. The user can adjust various settings and controls of the industrial plant via the HMI. Status information on the industrial plant can also be read out from the HMI.

Such an HMI is preferably adapted and, if necessary, customized to the control unit of a predetermined or changed environment or machine setting. Even an already fully configured HMI must regularly be updated, for example, when a process changes, when new or other products are manufactured using the industrial plant and so on. Such configuration and/or updating of the HMI configuration was previously accomplished by manually supplying the required data by way of a portable flash drive which is connected to the HMI by the user. For example, images of error messages or images of currently manufactured products are stored on a USB flash drive, which is then plugged into a corresponding USB interface of the HMI to transfer the image files to the HMI. The evaluation or documentation of data from an industrial plant was previously also done by way of such a flash drive. For this purpose, the HMI stores status information and other fixed data on the flash drive.

However, this approach has the drawback that the transfer of various data such as images for messages or types can be transferred to the HMI only in an insufficient and time-consuming manner. In addition, portable storage media such as USB flash drives entail security risks and are a gateway for malicious software code, such as viruses, malware, Trojans, etc. It is also possible in this manner that sensitive data is read out from the flash drive by unauthorized individuals.

A further drawback regarding the conventional configuration of the HMI arises from its limited memory and processing resources. The data and parameters supplied via the USB flash drive can not be processed by HMIs at all or only to a very limited extent. Any adaptation using the user interface of the HMI is also very time-consuming because an HMI is usually not designed to have a user adapt internally stored HMI data or data on a connected flash drive via the HMI. The data that is to be loaded into the HMI must therefore already be stored in the correct format on the flash drive, since subsequent processing of the data in the HMI is not possible or is only possible with difficulty.

OBJECT

It is therefore the object of the application to improve an devise and a method for transferring data to or from an HMI of a machine in the beverage industry, in particular a filling, labeling or packaging machine, in particular with regard to the efficiency and security of the data exchange with the HMI, for configuring the HMI, or for reading out data from the HMI.

SOLUTION

The object is satisfied according to the application by a device for a machine in the beverage industry, in particular a filling, labeling or packaging machine, a method, and an external control module. Advantageous embodiments and further developments are the subject matter of the dependent claims.

A device for a machine in the beverage industry according to one embodiment comprises an HMI for user input of control commands for the machine, in particular a filling, labeling or packaging machine. The device is configured to be connectable to an external control module via a wireless communication connection. The device can then exchange an HMI data set with the external control module by use of this wireless connection. The device can receive at least one HMI data set from the external control module, said data set comprising data or parameters for configuring the HMI.

Furthermore, at least one HMI data set can be transferred from the HMI to the external control module and comprise data or parameters for the evaluation or storage by the external control module. The device according to the application therefore avoids the need for a user to establish a physical connection between the HMI and a data storage medium in order to transfer data to or read data out from the HMI. A corresponding interface is no longer required, such as a USB interface, which is critical in terms of security. The device according to the application can be a separate module of the machine and can accordingly be connected to the HMI, communicate with the HMI, or at least control the HMI. Alternatively, the device according to the application can be the HMI itself or be integrated into the HMI, for example, as an HMI application extension.

The external control module according to the application can be connected wirelessly to a machine in the beverage industry, in particular, a filling, labeling or packaging machine or its HMI. For example, the external control module can be a mobile device such as, for example, a mobile phone/smartphone or a tablet computer, which can communicate with the machine or the HMI by way of suitable software or a specific application (app). This allows for simple and timely processing, compilation or formatting of the data to be sent to the HMI. This embodiment allows for existing mobile device resources to be used, such as its camera for capturing image files, its processor, further existing applications for processing the data, and/or wireless interfaces, such as a Bluetooth interface. The use of a special application with a predefined program sequence or predefined user-executable steps to exchange HMI data sets between the HMI and the external control module at the same time increases security and reduces the likelihood of mistakes as compared to the common methods of configuration using simple portable storage media, such as a USB flash drive.

Furthermore, the external control module can send preprocessed data to the HMI for the configuration of the HMI and for data exchange with the HMI, thereby reducing or avoiding further processing of the data in the HMI. Selecting data for the transfer is also simplified by the external control module. In addition, the USB interface of HMIs, which is critical in terms of security, that is not absolutely needed by the external control module, can be omitted.

For configuring the HMI, the data or parameters of a received HMI data set can be imported into the HMI. For this purpose, the type of data or parameters or the syntax of the received HMI data set can be used to import data or parameters, similar to the syntax of an XML or HTML file. For example, the layout of a new message or the position of a new image can thereby already be specified in the external control module or the mobile device, respectively. Alternatively or additionally, one or more machine commands can be transferred to the HMI together with or in the HMI data set. As a further option, user input can be entered by way of the HMI or received from the external control module (110).

BRIEF DESCRIPTION OF THE FIGURES

Embodiments of the present application shall be described with reference to the following drawings, wherein.

DETAILED DESCRIPTION

Figure 1:
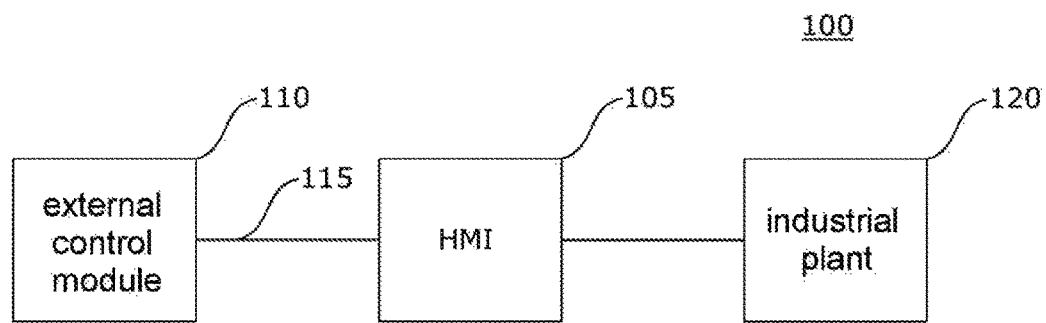
FIG. 1 shows a system in an industrial environment, in which an industrial plant is controlled by way of an HMI, and the HMI is configured according to one embodiment of the application by an external control module.

FIG. 1 shows an exemplary system in an industrial environment 100 in which an industrial plant or machine 120 is controlled by way of an HMI 105. Industrial plant 120 can comprise a plurality of machines and machine elements which are controlled by way of a central HMI or by way of a plurality of HMIs. One example of such an industrial plant 120 can be a beverage bottling system, but also any other environment which is controlled by way of an HMI. Further examples of a machine to which the embodiments of the application can be applied are a filling machine, a labeling machine, a packaging machine, a blow molding machine, a stretch blow molding machine, a cleaning machine, a transport system, a sealing machine, an impurity detection machine, and similar machines in the beverage and food industry.

HMI 105 can be either part of the industrial plant 120 or an external HMI which is connected to industrial plant 120. For example, HMI 105 can be connected to industrial plant 120 via an industrial network protocol. The HMI can be used by a user to monitor or control the machines. For example, an HMI can comprise a touch screen to facilitate interaction between the machine and a user.

Users can interact with industrial plant 120 via HMI 105. This can mean that users can start, end, customize, configure, stop, etc certain processes of industrial plant 120 via HMI 105. In addition, users can also read out data about industrial plant 120 via HMI 105. For example, HMI 105 can display status messages, diagnostic information, types of production (e.g., types of beverage for bottling), reports, error messages, analyses, statistics etc.

In order to adapt HMI 105 to the demands, specifics and conditions of industrial plant 120, an external control module 110 is connected to HMI 105 via a data connection 115. Data connection 115 between external control module 110 and HMI 105 can be both a wireless (e.g. Bluetooth, Wibree, WLAN, RFID, NFC, Infrared, GSM, ZigBee, WiMAX, etc.) as well as a wire-bound (e.g. USB, FireWire, LAN, serial data bus, optical fiber, etc.) data connection.

External control module 110 can comprise devices for data transmission to HMI 105 and for data reception from HMI 105. The data exchanged between HMI 105 and external control module 110 are presently generally referred to as an HMI data set or HMI data sets. However, an HMI data set which is loaded into HMI 105 from external control module 110 is generally of a different type than an HMI data set which is loaded into external control module 110 from HMI 105.

For example, HMI data sets are loaded by a technician from external control module 110 into HMI 105 for configuring HMI 105. Such HMI configuration data sets can be, for example, images (e.g. of production products, of messages, of logos, of directions and instructions etc.), but also special text messages (e.g. error messages and instructions for specific situations) and/or executable HMI data sets (e.g. control commands, firmware, or visualization projects of HMI 105, etc.).

In principle, however, all files can be transferred to HMI 105 and all files can also be read out and downloaded from HMI 105 by external control module 110. The files to be transferred in either direction are therefore not restricted to the above examples. For example, individual images can also be loaded from HMI 105 into external control module 110.

According to one embodiment, the HMI data set is preprocessed in external control module 110 prior to being transferred to HMI 105 via data connection 115. For example, HMI 105 can there only open and/or process specific file formats that are specifically suited for HMIs. For example, an operating system of HMI 105 can process only specific image files or generally only proprietary file formats. In such a case, external control module 110 can convert a file format of an image or another file to be transferred into the required file format for HMI 105 before it is transferred to HMI 105.

The content of an HMI data set to be transferred can also be processed by way of external control module 110. For example, an image or photo can be processed or a text can be edited, etc prior to the transfer.

A further embodiment of industrial plant 120 is described by way of example using a system for filling bottles. In this case, it can be advantageous for the configuration of HMI 105, if HMI 105 can display images of different types and bottles which are relevant for the various filling processes. One or more photographs of labels and/or of bottles can be entered into HMI 105 by use of external control module 110. For this purpose, external control module 110 can also comprise a camera with which photographs of labels and/or bottles can be taken directly. It is understood, however, that the images can also be loaded into external control module 110 in a different way, such as, for example, directly generated by a user by way of external control module 110, or via data transfer into external control module 110.

If HMI 105 can process only proprietary file formats, then external control module 110 can be configured to take photos directly in the proprietary file format by way of an internal or external camera. Alternatively or additionally, external control module 110 can also convert standardized file formats (e.g., *.jpg, *.gif, *.png, etc.) into proprietary and/or special file formats supported by HMI 105. This is done before an HMI data set is transferred to HMI 105.

External control module 110 can also have a secure memory environment in which files can be created which are then transferred to HMI 105. The secure memory environment prevents other applications in external control module 110 from accessing files in the secure memory environment, further enhancing the security and protection against malicious files. For example, in one embodiment, HMI 105 can accept only files from external control module 110 that were created by a user of external control module 110 in the secure memory environment of the external control module, such as photos taken by a camera of external control module 110 and saved directly in the secure memory environment.

According to a further embodiment, external control module 110 can also have a virtual environment stored with a virtual version of HMI 105. As a result, external control module 110 can first simulate an effect in the virtual HMI, which is achieved by the transfer of files to HMI 105. If, for example, malicious files are loaded into the virtual HMI, then external control module 110 can recognize this due to the virtual HMI and prevent these malicious files from being loaded into the real HMI 105.

According to an alternative embodiment, external control module 110 can also first send files for HMI 105 to a server which simulates a virtual HMI and first checks the files to be transferred and then releases or locks them if necessary.

In a further embodiment, HMI 105 itself can have stored a virtual HMI of itself in a separate memory area. Before files from external control module 110 are accepted by HMI 105, these files are first loaded into the virtual HMI by HMI 105 and executed or opened there. The respective data set is accepted by HMI 105 only if the virtual HMI determines that the HMI data set is harmless.

To further increase security, both external control module 110 and HMI 105 can comprise further mechanisms for examining HMI data sets which are transferred from external control module 110 to HMI 105. One examination of HMI data sets can be to examine the type of data. For example, during this examination, the type of data of the HMI data set can be compared with an internally stored database of types of data in order to determine whether HMI 105 can support and/or use the type of data of the HMI data set.

External control module 110 can be a device specifically produced for HMI 105 and designed exclusively for communication with HMI 105. In further embodiments, external control module 110 can also be a mobile telephone and/or a tablet computer that stores corresponding software. When such software is executed on the mobile telephone and/or on the tablet computer by a processor, the mobile telephone and/or the tablet computer can have the same or similar functionality as an external control module specifically provided for HMI 105. The corresponding software can be downloaded, for example, from a server or from a special application server and installed on the mobile telephone and/or on the tablet computer.

In the further description, the external control module is understood to mean both the device specifically produced for HMI 105 as well as a mobile telephone and/or tablet computer with corresponding software.

Figure 2:
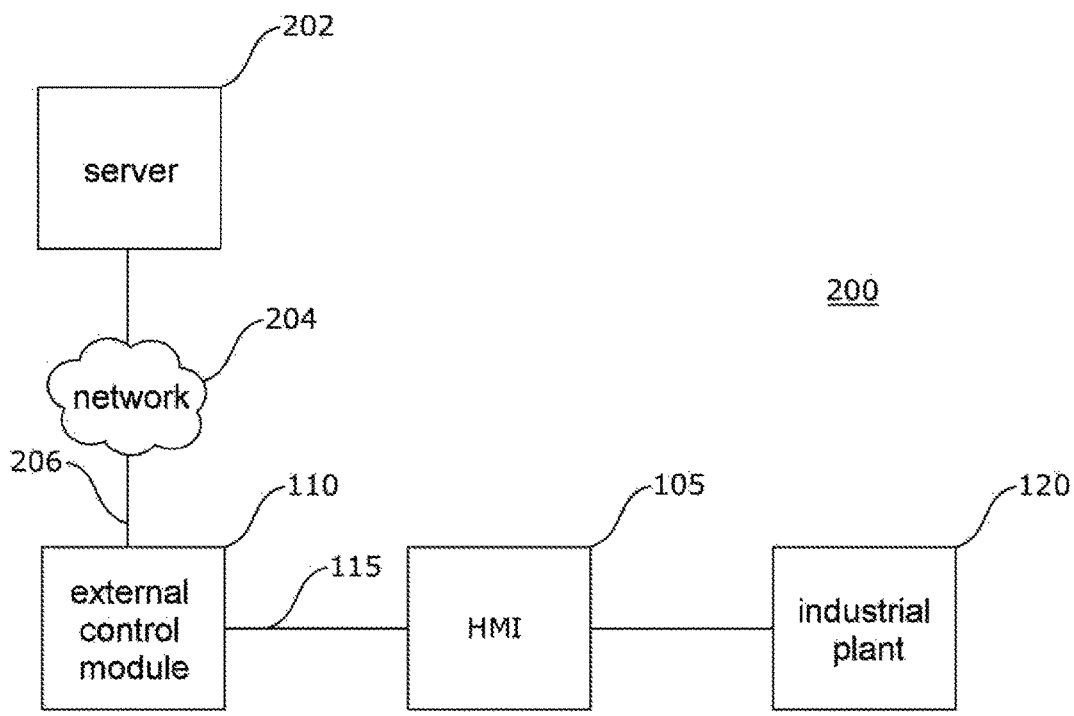
FIG. 2 shows a system in an industrial environment, in which an industrial plant is controlled by way of an HMI, and the HMI is configured according to one embodiment of the application by an external control module, wherein the external control module has access to a server.

FIG. 2 shows a further embodiment which also comprises all the elements from FIG. 1 and in which external control module 110 can additionally be connected to a server 202 via a network 204. All conventional wire-bound and/or wireless connection types can be used for connection 206 between external control module 110 and network 204. Although only one server 202 is shown in FIG. 2, it is nevertheless understood that several servers can also be present in network 204 with which external control module 110 can communicate.

Network 204 can be both a local network in, for example, a factory or a production site 200, as well as a larger-scale network, such as the Internet.

Server 202 can have various functions implemented. For example, server 202 can belong to a manufacturer of HMI 105 and/or be part of industrial plant 120. A user of external control module 110 can therewith request, for example, technical assistance and support from server 202. This allows, for example, that a manufacturer's employee is given remote access to HMI 105 via server 202 and external control module 110 in order to provide technical assistance.

Additionally or alternatively, server 202 can also be an archive server and/or a configuration computer. External control module 110 can use it to back up and archive data downloaded from HMI 105. For example, entire projects can be stored by HMI 105 on server 202 for project backup. At the same time, data (e.g. archived project backups, firmware updates, software updates, add-ons, visualization projects, user interfaces, etc.) can also be downloaded by server 202 to external control module 110 and then transferred to HMI 105.

Additionally or alternatively, server 202 can also be a security server that stores a virtual version of HMI 105. As described above, external control module 110 can then transfer files first to server 202. The files thus received are then first read into the virtual HMI on server 202 and an effect of the files is simulated. In this manner, server 202 can determine whether the files are harmful to HMI 105 and/or to industrial plant 120. Only when server 202 classifies the files as non-hazardous, can the files then be transferred from external control module 110 to HMI 105.

Additionally or alternatively, server 202 can also be an application server. Application server 202 can make available, for example, respective software for external control module 110. In one embodiment, application server 202 can be configured, for example, to download an application (app) to external control module 110, wherein the external control module in this embodiment is a mobile telephone (e.g., smartphone) and/or a tablet computer. For example, in this case, server 202 can be the "Google Play Store", the "Apple App Store", or any other already existing application server for downloading applications.

Figure 3:
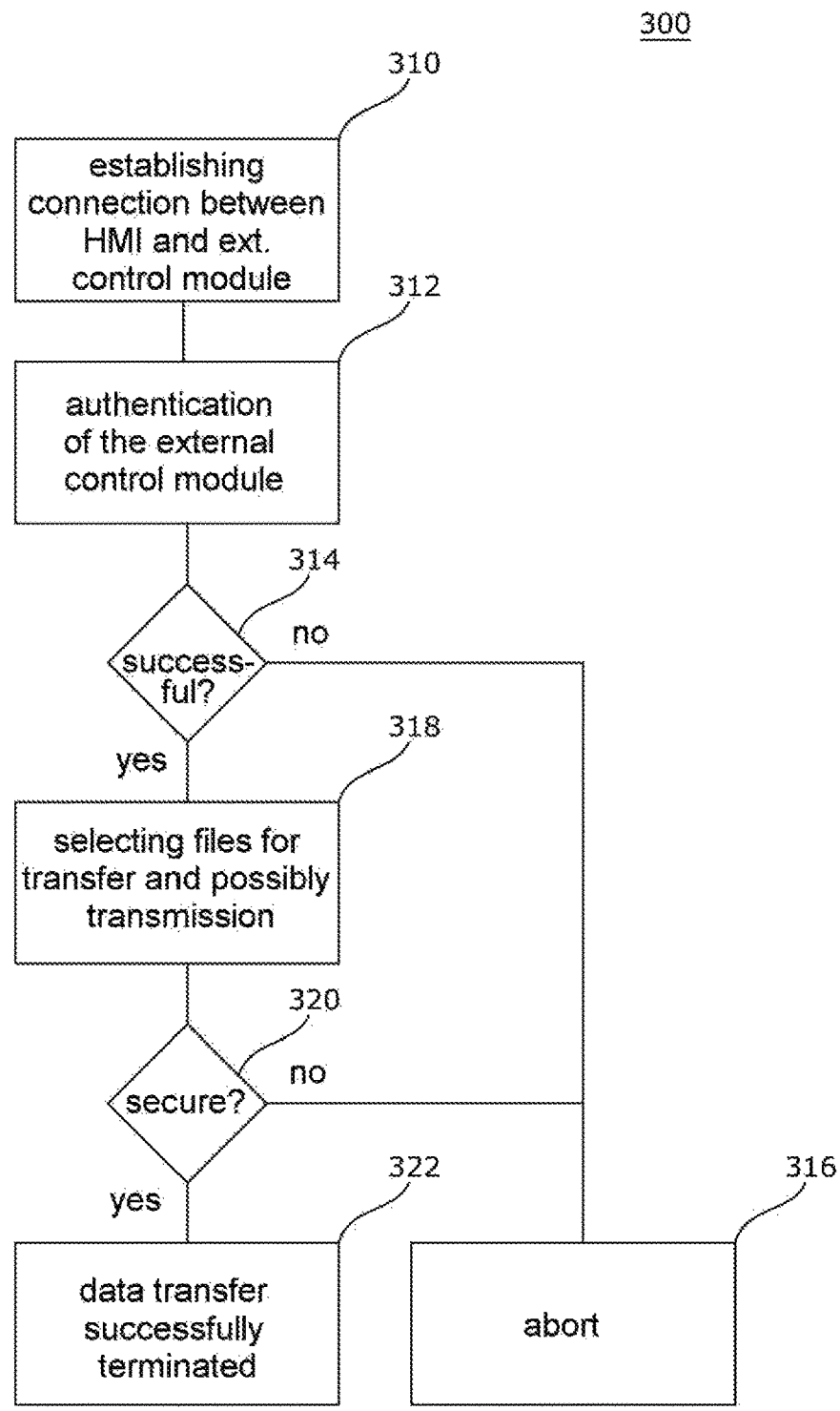
FIG. 3 shows a flow diagram for a method for data transfer between an HMI and an external control module according to one embodiment of the application.

FIG. 3, by way of example, shows a flow chart for a method 300 which describes an embodiment of a data transfer.

In step 310, an attempt is made to establish a connection between HMI 105 and external control module 110. The initiation for establishing the connection is preferably executed by external control module 110. In one embodiment, it can be necessary for a user of external control module 110 to be in physical contact with HMI 105 to prevent unauthorized access to HMI 105 from the outside. For example, a user can first enter a control command directly into HMI 105 in order to prepare HMI 105 for an upcoming connection to external control module 110. HMI 105 can then be in a search mode in which it can receive incoming connection requests from an external control module 110. Alternatively, the initiation for establishing the connection can also be directly executed by HMI 105.

In optional step 312, an authentication process for external control module 110 can be performed. For example, external control module 110 can be prompted by HMI 105 to send an access code to HMI 105. Other authentication processes are also possible. Whether the authentication of external control module 110 was successful is determined in step 314 If authentication was not successful, then the method is aborted at step 316.

After successful authentication of external control module 110 on HMI 105, files for the transfer between HMI 105 and external control module 110 are selected in step 318 and, if necessary, provisionally transferred. The step of selecting files to be transferred is preferably executed in external control module 110. The step of selecting files to be transferred can alternatively also take place in HMI 105.

In the event that the transfer direction in method 300 is from external control module 110 to HMI 105, the files to be transferred can first be simulated for harmfulness in a virtual HMI. This examination can take place in server 202 in which HMI 105 and/or external control module 110 itself occur. Depending on where this examination is conducted, the files are respectively transferred there first.

In step 320, it is determined whether the selected files are secure, i.e. whether they are harmful to HMI 105 and/or industrial plant 120. If it is determined that the files are harmful, then method 300 is aborted at step 316 The harmful files can then, for example, be deleted and a corresponding message can be displayed in external control module 110 and/or in HMI 105.

If it is determined in step 320 that the files are not harmful, then the data transfer is successfully terminated in step 322. This means that HMI 105 receives the selected files and processes them accordingly. In the other direction of transfer, this means that the files have been successfully downloaded by HMI 105 into external control module 110 and can then be processed, forwarded, archived, or viewed in external control module 110.

According to one embodiment, external control module 110 can be a mobile device, such as a smartphone, a cell phone, and/or a tablet computer. A user can use the mobile device to create images for a message or a type and transfer the data to the HMI using an app on the mobile device.

An exemplary sequence of such an embodiment is described below.

With his or her mobile device, the user can access an application server such as the "Apple App Store" or the "Google Play Store". From there, he or she can download to and install in the mobile device the corresponding app, which allows and controls the transport of files from an HMI to the mobile device as well as the transport of files from the mobile device to an HMI.

With the respectively downloaded app, the user can create images for messages, types, logos, etc. For this purpose, the app can use the camera of the mobile device. The images can be stored on the mobile device and then transferred to a connected HMI. This can enable assigning images to messages and types, etc.

With the downloaded app, however, data can also be transferred from the HMI to the mobile device, such as reports, types, diagnostic files or a complete visualization project. This data can be transferred everywhere via WLAN, mobile radio etc. Suitable data such as types or project backups can also be transferred from the mobile telephone to the HMI.

The downloaded app can also establish a connection to a configuration computer and import project backups.

Via a connection to the Internet or to a network, project backups etc. can be stored in an archive server by use of the downloaded app.

It is further pointed out that the features mentioned in the above-described embodiments are not restricted to these particular combinations, but are also possible in any other combinations as further embodiments.

The invention claimed is:

1. A device for transferring data from a beverage industry machine performing a process, wherein said device comprises a human machine interface (HMI) for user input of control commands to said beverage industry machine, and said data is transferred to said HMI or received by said HMI, and
    wherein said device is configured to be connectable to an external control module via a wireless communication connection to exchange at least one HMI data set with said external control module, wherein:
        said at least one HMI data set is received by said external control module and comprises data or parameters for configuring said HMI, and/or
        said at least one HMI data set is transferred from said HMI to said external control module and comprises data or parameters for evaluation or storage, and
        said data or parameters comprise images of one or more of different types, bottles, and labels relevant for the process.

2. The device according to claim 1, wherein said device is further configured to configure said HMI according to said data or parameters of said at least one received HMI data set, wherein configuring said HMI comprises importing said data or said parameters of said received at least one HMI data set, and said importing is based on one or more of the following criteria:
    a type of data of said data or parameters,
    a syntax of said received at least one HMI data set,
    a machine command received with said received at least one HMI data set, and
    a user input entered by way of said HMI or received from said external control module.

3. The device according to claim 1, wherein said external control module is a mobile telephone or a tablet computer, and said device is configured to be connectable to said external control module via a wireless communication interface of said external control module, by way of a mobile radio connection or by way of an Internet connection.

4. The device according to claim 1, wherein said device is further configured to communicate only with a particular application of said external control module, or to accept only such HMI data sets from said external control module which were created in a secure memory and/or processing environment of said external control module.

5. The device according to claim 1, wherein:
said at least one HMI data set received by said external control module comprises at least one image file, one executable machine command, one table, one text file, one project backup file, or one visualization project, and/or
said at least one HMI data set transferred to said external control module comprises at least one report, diagnostic information, one visualization project, one project backup file, or one current status.

6. The device according to claim 1, wherein the beverage industry machine is a filling, labeling, or packaging machine.

7. The device according to claim 1, wherein the external control module is a mobile device.

8. A method for controlling a beverage industry machine performing a process, comprising:
establishing a wireless data connection for exchanging at least one human machine interface (HMI) data set between an HMI for user input of control commands to said beverage industry machine and an external control module; and
exchanging said at least one HMI data set between said HMI and said external control module via said wireless data connection, wherein:
said at least one HMI data set is received by said external control module and comprises data or parameters for configuring said HMI, and/or
said at least one HMI data set is transferred from said HMI to said external control module and comprises data or parameters for evaluation or storage, and
said data or parameters comprise images of one or more of different types, bottles, and labels relevant for the process.

9. The method according to claim 8, said method further comprising:
configuring said HMI, wherein said configuring comprises importing the data or the parameters of said received at least one HMI data set, where said importing is based on one or more of the following criteria:
a type of data of said data or said parameters,
a syntax of said received at least one HMI data set,
a machine command received with said received at least one HMI data set, and
a user input entered by way of said HMI or received from said external control module.

10. The method according to claim 8, said method further comprising:
receiving said at least one HMI data set by said external control module, wherein said at least one HMI data set comprises an image file, an executable machine command, a table, a text file, a project backup file, or a visualization project, and/or
sending said at least one HMI data set to said external control module, wherein said at least one HMI data set comprises at least one report, diagnostic information, one visualization project, one project backup file, or one current status.

11. The method according to claim 8, wherein the beverage industry machine is a filling, labeling, or packaging machine.

12. An external control module for exchanging data with a human machine interface (HMI) of a beverage industry machine performing a process, wherein said HMI is used for user input of control commands to said beverage industry machine, and wherein said external control module is configured to be wirelessly connectable to said HMI to exchange at least one HMI data set with said HMI, wherein:
said external control module is configured to send said at least one HMI data set to said HMI or said beverage industry machine, and said least one HMI data set comprises data or parameters for configuring said HMI, and/or
said external control module is configured to receive said at least one HMI data set from said HMI or said beverage industry machine, and said at least one received HMI data set comprises data or parameters for evaluation or storage by said external control module, and
said data or parameters comprise images of one or more of different types, bottles, and labels relevant for the process.

13. The external control module according to claim 12, wherein said external control module is a mobile telephone or a tablet computer which is configured such that a specific application is installed on said external control module and communicates with said HMI or said beverage industry machine via a wireless communication connection or a mobile radio connection, wherein
said specific application is adapted in said external control module to create said at least one HMI data set and transfer it to said HMI or said beverage industry machine, wherein said at least one HMI data set comprises at least one image file, one executable machine command, one table, one text file, one project backup file, and/or one visualization project.

14. The external control module according to claim 13, wherein a syntax of said at least one HMI data set indicates how said data or said parameters of said at least one HMI data set are to be imported into said HMI, or wherein said at least one HMI data set is transferred to said HMI or said beverage industry machine with a machine command which indicates how said data or said parameters of said at least one HMI data set are to be imported into said HMI.

15. The external control module according to claim 12, wherein said external control module is a mobile telephone or a tablet computer which is configured such that a specific application is installed on said external control module and communicates with said HMI or said machine via a wireless communication connection or a mobile radio connection, wherein
said specific application on said external control module is set up to receive said at least one HMI data set from said HMI or said beverage industry machine, wherein said at least one received HMI data set comprises at least one report, diagnostic information, one visualization project, one project backup file, and/or one current status, and said specific application is set up to store or evaluate said received HMI data set or to display its data on a screen of said external control module.

16. The external control module according to claim 12, wherein the beverage industry machine is a filling, labeling, or packaging machine.

17. The external control module according to claim 12, wherein the external control module is a mobile device.

* * * * *